United States Patent
Barth

[15] 3,681,399
[45] Aug. 1, 1972

[54] YIELDS IN THE PREPARATION OF PURIFIED PHTHALIC ANHYDRIDE

[72] Inventor: Hans-Dieter Barth, Geyen, Germany

[73] Assignee: Chemiebau Dr. A. Zieren GmbH and Co. KG, Cologne, Braunsfeld, Germany

[22] Filed: Feb. 6, 1969

[21] Appl. No.: 797,211

[30] Foreign Application Priority Data

Feb. 7, 1968 Germany............P 16 43 863.4

[52] U.S. Cl..............................260/346.4, 260/346.7
[51] Int. Cl.............................................C07c 63/18
[58] Field of Search........................260/346.4, 346.7

[56] References Cited

UNITED STATES PATENTS 2,815,352  12/1957  Johannsen et al. ........260/346.4
3,178,452  4/1965   Smith et al.................260/346.4

Primary Examiner—Alex Mazel
Assistant Examiner—Bernard Dentz
Attorney—Millen, Raptes & White

[57] ABSTRACT

In the production and purification of phthalic anhydride by the vapor phase oxidation of o-xylene wherein it is customary to remove a predistillate containing substantial quantities of volatile impurities before conducting the main distillation, the improvement of recycling the predistillate to a prior stage in the process, preferably to the effluent from the catalytic reactor, without causing any substantial decrease in purity, but simultaneously increasing the yield of purified product.

5 Claims, 1 Drawing Figure

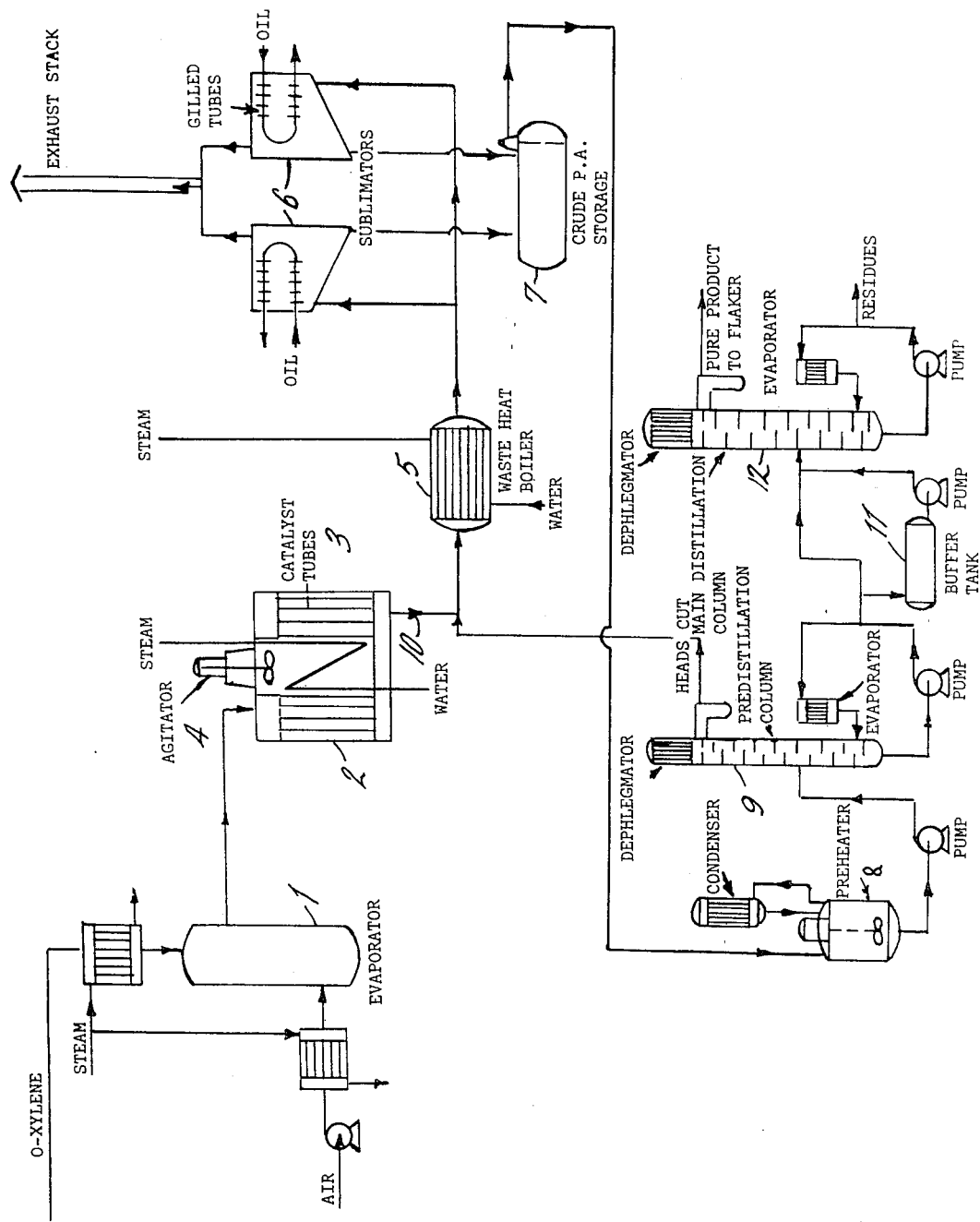

YIELDS IN THE PREPARATION OF PURIFIED PHTHALIC ANHYDRIDE

BACKGROUND OF THE INVENTION

This invention relates to a process for the preparation of substantially pure (about 99.8 percent) phthalic anhydride by the catalytic oxidation of a mixture of an aromatic hydrocarbon and air, separation of the resultant formed phthalic anhydride from the oxidized product gas, and purification of the separated crude phthalic anhydride by distillation, wherein at least one distillation forerun or predistillation distillate containing the more volatile impurities is removed as an impurity.

During the oxidation of o-xylene to phthalic anhydride, small quantities of maleic anhydride and benzoic acid are produced which must be removed from the phthalic anhydride to meet the purity specifications required of the plastics industry. Therefore, the crude phthalic anhydride congealed from the product gas stream is distilled, thus obtaining a predistillation fraction rich in maleic acid anhydride and benzoic acid, but consisting predominantly of phthalic anhydride. This predistillation fraction or forerun, which can amount to about 0.5 – 1.0 percent by weight of the amount of the final product, was not considered of any commercial value. It generally was either burned or sent to waste since it was uneconomical to separate by distillation pure phthalic anhydride from maleic anhydride and the other impurities, principally owing to the high steam consumption and column costs associated with such distillation.

For further background of this invention, reference is invited to Kirk-Othmer, *Encyclopedia of Chemical Technology*, 2nd Ed., 1968, Vol. 15, 448–456.

SUMMARY OF THE INVENTION

This invention is predicated on the unexpected discovery that the predistillation cut or forerun, (phthalic anhydride loaded with volatile impurities), can be recycled to an earlier stage in the process without causing a buildup of impurities in the final product and with the net result being an increased yield of purified phthalic anhydride.

An object of this invention, therefore, is to provide an improved process for the production of phthalic anhydride whereby an increased yield of purified phthalic anhydride is obtained with substantially no sacrifice in purity and with minimal additional investment and operating costs.

Upon further study of the specification and claims, other objects and advantages of the present invention will become apparent.

DETAILED DISCUSSION OF THE INVENTION

This invention is applicable to any vapor phase process for the production of phthalic anhydride preferably based on the air oxidation of o-xylene. Details of these processes are given, for example, in Kirk-Othmer, cited supra. Thus the composition of the predistillation cut or forerun will generally have the following range of analysis:

| Component | % by weight |
| --- | --- |
| o-xylene as starting material | |
| phthalic anhydride | 30—90 |
| components having a lower boiling point than phthalic anhydride | 10—70 |
| maleic anhydride | 2—40 |
| benzoic acid | 5—60 |

Such streams are obtained as foreruns in a batch distillation, for example, the first 0.2 to 2.5 weight percent, preferably 0.5 to 1.0 weight percent, of the total distillate obtained. With respect to a continuous distillation, a predistillation column would be operated to yield as overhead (herein called predistillation cuts) streams of the tabulated compositions and the bottoms would then be sent to the main distillation column; the ratios of distillates would then be generally the same in both the continuous and batch methods of operation. For the sake of simplicity, the remainder of the discussion will refer only to foreruns, it being understood that predistillation cuts are the equivalent for the purposes of this invention.

Without being bound by an explanation of the mechanism of the invention, it is seen that the product gas stream, leaving the catalyst chamber at a temperature of about 350°–390° C., is considerably undersaturated with respect to phthalic anhydride and the readily volatile by-products. Therefore, it is possible to evaporate the forerun into the product gas stream and to conduct it, together with the product gas from the oxidation, through the phthalic anhydride separators. In the separators, the product gas stream is cooled indirectly to temperatures far below the saturation temperature of the phthalic anhydride, e.g., to about 50°–60 C., solid phthalic anhydride being deposited on the cooling surfaces. Now, without recycling the forerun into the product gas stream, the residual gas in the separator is saturated in phthalic anhydride, or rather supersaturated, because vapor pressure equilibrium is not completely attained. Consequently, when the forerun is introduced into the product gas, additional phthalic anhydride must be deposited in the separators.

Maleic anhydride and benzoic acid impurities do not remain completely in the residual gas, despite their volatility, but rather are condensed to a finite extent with the phthalic anhydride. On the other hand, it has been unexpectedly discovered, when recycling the forerun into the product gas stream, thereby increasing the concentration of phthalic anhydride, maleic anhydride and benzoic acid in the product gas, that, though the yield of solid phthalic anhydride is increased, there is no significant increase and in some cases even a decrease in the contamination of the phthalic anhydride by maleic anhydride and benzoic acid. In essence then, instead of what would have appeared to be a self-defeating operation with respect to product purity, the phthalic anhydride contained in the forerun can be recovered substantially completely without any deleterious effect on the overall process. Furthermore, because the residual gas leaving the separators is enriched in maleic anhydride and benzoic acid, it is easier to separate same from the remaining components of the residual gas. Finally, a still further important advantage of the process of this invention resides in the fact that the phthalic acid recovery from the forerunnings of an existing plant can be accomplished without any additional costly apparatus.

In accordance with the preferred embodiment of the invention, the forerunnings containing the more readily volatile impurities is introduced to the product gas stream directly after leaving the catalytic oxidation step and before the product stream has substantially cooled down. Thus, the forerun is fed into the hot product gas stream at a point as close as possible to the downstream side of the catalyst furnace, preferably where the product gas is at a temperature of at least 200° C., more preferably at least 285° C. In this way, the liquid forerun is immediately and automatically evaporated, and the volatile components from the forerun are uniformly mixed with the product gas, whereby the concomitant separation of these components with the phthalic anhydride is reduced.

It is also possible to spray the forerun, together with the o-xylene or naphthalene, or separately therefrom, into the oxidation air upstream of the catalyst furnace. This mode of operation also encompasses the concept of utilizing the separating effect of the separator for fractionating the forerun, and results in an increase in the yield of phthalic anhydride. Nevertheless, introduction downstream of the catalyst is preferred, due to the unavoidable combustion reactions on the catalyst.

Preferably, the forerun is introduced through nozzles in the liquid form into the product gas stream before the latter is subjected to an intermediate cooling step conducted at 200°-150° C., preferably 170° C., prior to the product gas entering the separator. The forerun obtained during the discontinuous batch or continuous distillation of the crude phthalic anhydride is thus preferably fed in the liquid form through a heated pipeline to the product gas line between the catalyst furnace and the intermediate cooler, and introduced into the product gas at that point in the liquid form through nozzles, whereby a rapid evaporation and mixing with the product gas is obtained. The purpose for heating the recycle line is to prevent precipitation of phthalic anhydride therein; accordingly, the heating is sufficient to retain the contents of the line in the liquid phase, or preferably at least to 130° C. It is also possible, especially in the batch distillation of the raw product, to pass the forerun in a batch-wise manner to the product gas.

THE DRAWING

The FIGURE shows a plant for the production of phthalic anhydride from o-xylene with purification by continuous two-stage distillation.

The air for the oxidation is filtered to eliminate dust, heated with steam and introduced into an evaporator 1. Preheated o-xylene is sprayed into the air stream in the evaporator 1 so that the air contains about 40 g o-xylene/Nm³. This mixture is fed into the catalytic converter 2 at 135° C. for the oxidation. The oxidation heat developed in the catalyst tubes 3 is removed by means of a salt melt circulated in the converter by an agitator 4. The oxidation heat is removed from the salt melt by evaporative cooling so that the reaction temperature is held constant at 350°-360° C. The converter gas which contains phthalic anhydride vapor and the secondary products is cooled to approximately 170° C. in a waste heat boiler 5, which produces steam at 6 atmg. Condensation of the crude phthalic anhydride takes place in precipitators 6 which are alternately cooled and heated. The sublimate is formed at temperatures between 50° and 60° C. It melts when the wall temperature of the precipitator rises to 170°-180° C. and runs down into a storage tank 7.

The incondensible gases and vapors still contain some phthalic anhydride and volatile products of secondary reactions. The collected crude product flows from the storage tank 7 into a preheater 8 for thermal pretreatment during which the crude phthalic anhydride is brought to 150°-285° C. under a slightly reduced pressure. In this pretreatment water is split off from phthalic acid evaporating with part of the lower boiling substances. The pretreatment product is then distilled in a predistillation column 9 in which a heads cut is separated off containing phthalic anhydride and the lower boiling substances (maleic anhydride, benzoic acid, o-toluic acid). This heads cut is continuously sprayed into the reaction gas pipe 10 between the converter 2 and the waste heat boiler 5. The sump of the predistillation column 9 flows via a buffer tank 11 into the main distillation column 12 where the pure product with about 99.9 percent by wt. phthalic anhydride is obtained over head with the high-boiling residues drawn-off at the bottom of this column.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

Technical o-xylene 10.5 kg having a purity of about 95 percent by weight is sprayed into a hot air stream, so that the resultant concentration is about 40 g./Nm³. The gaseous stream is then conducted through a catalyst furnace charged with a $V_2O_5$ catalyst, the temperature therein being maintained at 350°-360° C. The product gas leaving the catalyst furnace is first cooled to 170° C. and is then conducted through a separator which indirectly cools the product gas to 55° C. During this step, a crude phthalic anhydride is separated, containing 98.7 percent by weight of phthalic anhydride, 0.3 percent by weight of maleic anhydride, 0.2 percent by weight of benzoic acid, 0.2 percent by weight of polymers, 0.5 percent by weight of water, and traces of sulfur.

The thus-obtained crude phthalic anhydride is distilled for purification purposes, 0.8 percent by weight of the product being separated as a forerun containing 70 percent by weight of phthalic anhydride, 20.8 percent by weight of benzoic acid, and 9.2 percent by weight of maleic anhydride. Subsequently, there is distilled off and collected 9.75 kg of pure product analyzing 99.8 percent by weight phthalic anhydride. This corresponds to a theoretical yield of 69.7 percent and is representative of the prior art process.

EXAMPLE 2

Example 1 was repeated, but the 78 g. of forerun obtained in the distillation was sprayed into the product gas stream after the latter was withdrawn from the catalyst furnace. The thus-separated crude phthalic anhydride exhibited the same concentration of maleic anhydride and benzoic acid as in Example 1. The crude product was distilled, there being obtained, after withdrawing one forerun, 9.80 kg. of pure product having 99.8 percent by weight of phthalic anhydride. This corresponds to a theoretical yield of 70.2 percent, or approximately an 0.7 percent increase over the prior art without any significant decrease in purity, if at all. This means that for a relatively small plant of 5,000 tons/yr., the increased yield would result in yearly savings on the order of $7,000; moreover, total U.S. production of phthalic anhydride is about 350,000 – 400,000 tons/year.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the production of distilled phthalic anhydride comprising the successive steps of
    A. catalytically oxidizing o-xylene with air to form product gas containing phthalic anhydride and volatile impurities;
    B. cooling said product gas by indirect heat exchange with a coolant to separate therefrom the thus-produced phthalic anhydride as a solid contaminated with volatile impurities; and
    C. purifying the separated solidified impure phthalic anhydride by distillation wherein forerunnings containing phthalic anhydride and said volatile impurities are removed from the distillation to avoid contamination of pure product produced from the main distillation, said forerunnings comprising 2 – 40 percent by weight of maleic anhydride;
    the improvement comprising recycling said forerunnings to said product gas having a temperature of at least 200° C. between steps (A) and (B), prior to said gas being separated as a solid, whereby the yield of phthalic anhydride is increased without any significant decrease in product purity.

2. A process as defined by claim 1 wherein said forerunnings are passed in the liquid phase to said product gas stream and sprayed through a nozzle into said product gas stream, simultaneously cooling said product gas stream and evaporating said forerunnings to form a homogeneous cooled gaseous mixture.

3. A process according to claim 1 wherein the forerunnings are recycled into the product gas stream at a point where the temperature of the gas stream is at least 285° C.

4. A process according to claim 3 wherein in step (B) the impure phthalic anhydride is cooled to about 50°–60 C.

5. A process according to claim 3 wherein the forerunnings of step (C) constitute up to about 2.5 percent by weight of the total distillate.

* * * * *